United States Patent [19]

Ono

[11] Patent Number: 4,825,387

[45] Date of Patent: Apr. 25, 1989

[54] FRAME POSITIONING METHOD

[75] Inventor: Masaru Ono, Tokyo, Japan

[73] Assignee: Fuji Photo Film Co., Ltd., Minami-Ashigara, Japan

[21] Appl. No.: 12,653

[22] Filed: Feb. 9, 1987

[30] Foreign Application Priority Data

Mar. 7, 1986 [JP] Japan .................. 61-48554

[51] Int. Cl.$^4$ .................. G06F 15/40; G03B 23/08
[52] U.S. Cl. .................. 364/518; 355/40; 353/27 A
[58] Field of Search .................. 354/120; 353/27 A; 355/40, 41; 364/518

[56] References Cited

U.S. PATENT DOCUMENTS

| | | | |
|---|---|---|---|
| 3,722,991 | 3/1973 | Edhlund | 353/27 |
| 4,443,858 | 4/1984 | Piatan | 364/518 |
| 4,529,281 | 7/1985 | De Roche et al. | 353/27 A |
| 4,549,797 | 10/1985 | Sawano et al. | 353/27 A |
| 4,659,213 | 4/1987 | Matsumoto | 355/38 |
| 4,671,648 | 6/1987 | Watanabe et al. | 355/40 |
| 4,724,464 | 2/1988 | Umeda et al. | 355/40 |

FOREIGN PATENT DOCUMENTS 0041436 12/1981 France .................. 353/27 A
8602174 4/1986 World Int. Prop. O. .

Primary Examiner—Gary V. Harkcom
Assistant Examiner—Phu K. Nguyen
Attorney, Agent, or Firm—Wenderoth, Lind & Ponack

[57] ABSTRACT

In a microfilm retrieval device, the frame which is located at the position corresponding to the frame address is automatically retrieved to project the object frame on the screen of the reader. In such a retrieval device, it is necessary to be able to appropriately and precisely position the object frame regardless of the type and size of the frame pitch on the microfilm. Precise positioning of the object frame is accomplished by designating two arbitrary frames of different addresses and calculating the reference frame pitch between them.

3 Claims, 3 Drawing Sheets

FIG. I PRIOR ART
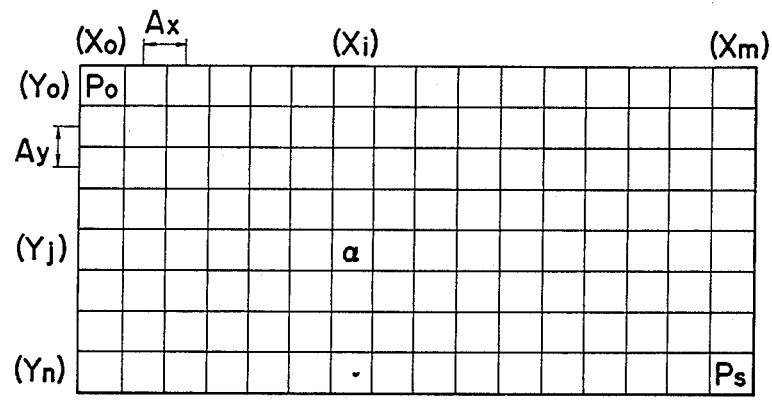
FIG. 2 PRIOR ART
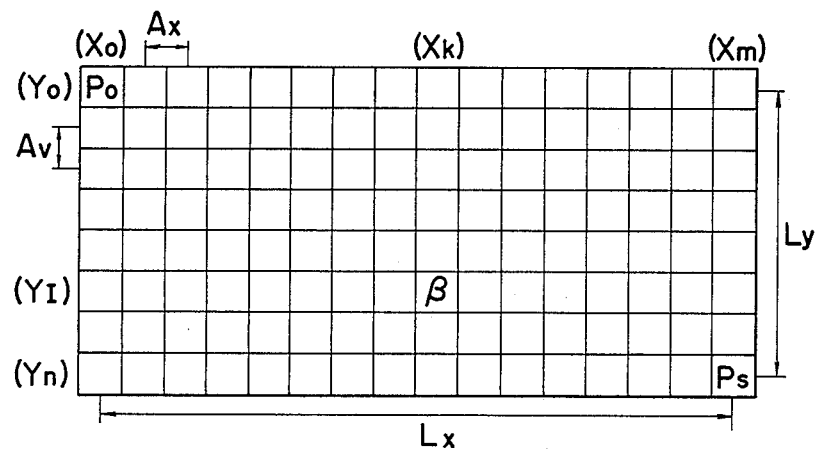

FRAME POSITIONING METHOD

BACKGROUND OF THE INVENTION

The present invention relates to a method for positioning a frame in a microfiche microfische retrieval device.

As is well-known, when automatically retrieving a frame recorded on a microfiche with a microfische retrieval device, the target frame is automatically positioned by inputting the address of the frame (expressed by the numbers of frames from the reference frame in row and column) on the keyboard of the retrieval device to make the device convey the microfiche and to detect the frame corresponding to the address so as to be able to project the target frame on a reader screen.

FIG. 1 graphically shows an example of a frame arrangement of a microfiche which has hitherto been used. On this microfiche (m+1) frames are recorded along the horizontal (row) direction X and (n+1) frames are recorded along the vertical (column) direction Y from a "reference frame" $P_0$ (its address being (0, 0)) which is the first address at the top left corner to a "span frame" $P_s$ (its address being (m, n)) which is the target address at the right bottom corner in the figure. The pitch between adjacent frames is known since it has been specified when photographed. The value is $A_x$ in the direction of the X axis and $A_y$ in the direction of the Y axis. The value is presumed to be manually inputted into the retrieval device in advance.

Conventionally, the reference frame $P_0$ which is the reference point for positioning frames is first set as the position of projection of the retrieval device. The device measures the distance from the mechanical origin (not shown) thereof by the amount of displacement (for example, the number of pulses) when the film is conveyed and calculates the position of the reference frame $P_0$ in terms of a coordinate value $(X_0, Y_0)$. When the address of the frame to be retrieved, fore example (i, j) of "α" is inputted, the coordinate value $(X_i, Y_j)$ of the frame "α" is calculated from the following formula (1) using the coordinate value $(X_0, Y_0)$ of the reference frame $P_0$ and the reference pitches $A_x$, $A_y$.

$$\left. \begin{array}{l} X_i = X_o + i \cdot A_x \\ Y_j = Y_o + j \cdot A_y \end{array} \right\} \quad (1)$$

Such method of positioning, is effective when the pulse number for measuring the position is an integer for each frame. However, some microfiches accompany a pulse fraction per frame. This causes a problem because as the fraction accumulates, an error increases and makes the precise positioning of the object frame difficult. If the size of microfiche varies or the pitch of the frame fluctuates, an error will be caused in the coordinate value thereof to incapacitate precise positioning of the object frame.

Japanese Patent Laid-open No. 195273/1983 discloses a method for positioning a frame by the present applicant which aims at solving the above problems. In the method for positioning a frame, as shown in FIG. 2 which corresponds to the above FIG. 1, the position of the reference frame $P_0$ is measured in the coordinate values $(X_0, Y_0)$ and that of the span frame $P_s$ in the coordinate values $(X_m, Y_n)$ while the displacements between above two frames $L_x$ and $L_y$ are calculated from the coordinate values by the following formula (2).

$$\left. \begin{array}{l} L_x = X_m - X_o \\ L_y = Y_n - Y_o \end{array} \right\} \quad (2)$$

The reference pitches $A_x$, $A_y$ are obtained not from the pitch as explained above but by using the displacements $L_x$, $L_y$ and the number of frames (m×n) from the following formula (3).

$$\left. \begin{array}{l} A_x = L_x/m \\ A_y = L_y/n \end{array} \right\} \quad (3)$$

When the address of a frame "β" to be retrieved, for example, (k, l) as shown in FIG. 2 is inputted, the coordinate values of the frame β $(X_k, Y_l)$ can be calculated from the following formula (4) using the coordinate values $(X_0, Y_0)$ of the reference frame $P_0$ and the reference pitches $A_x$, $A_y$ obtained from the above formula (3).

$$\left. \begin{array}{l} X_k = X_o + k \cdot A_x = X_o + \dfrac{k}{m} \cdot (X_m - X_o) \\ Y_l = Y_o + l \cdot A_y = Y_o + \dfrac{l}{n} \cdot (Y_n - Y_o) \end{array} \right\} \quad (4)$$

In this method for positioning the frame, the maximum distances between the exposed frames $L_x$ and $L_y$ of the microfiche are measured as explained above and the maximum distances $L_x$ and $L_y$ are divided by the number of frames to obtain the reference pitches $A_x$ and $A_y$. Even if the size of the microfiche changes or if the dimension varies, the error becomes extremely small without being accumulated to thereby enable a target frame to be positioned precisely.

In the method, both the reference frame $P_0$ and span frame $P_s$ have to be photographed. Recorded images have to be very clear since the frames will be used as the reference position as mentioned above. However, some microfiches only have a letter for an index, for example, recorded in the reference frame $P_0$. Or, since the span frame $P_s$ comes at the very end of the film, some films have nothing recorded in the frame $P_s$ for the convenience of editing. In both cases, they cannot be used as reference frames in positioning. This causes a problem in that the above-mentioned method for positioning a frame is not applicable to such microfilms.

SUMMARY OF THE INVENTION

The present invention is proposed to obviate the above problems encountered in the prior art. An object of the present invention is to provide a method for positioning a frame which can automatically retrieve any of the frames which corresponds to the frame address of the other by merely designating two arbitrary frames where images are already recorded.

According to one of the present invention, for achieving the objects described above, there is provided a frame positioning method which can precisely position an arbitrary frame recorded on microfiche by designating two arbitrary frames of different addresses which are recorded on a microfiche mounted in a retrieval device, obtaining the addresses of said frames when they are displaced with respect to a predetermined position on said retrieval device, obtaining coordinates thereof on said device, calculating the reference frame pitch between said frames of the microfiche and calculating the reference coordinates by using said addresses and coordinates.

BRIEF DESCRIPTION OF THE DRAWINGS

In the accompanying drawings:

FIGS. 1 and 2 are the graphs to explain a prior art method for positioning a frame;

DETAILED DESCRIPTION OF THE INVENTION

In the method for positioning a frame according to the present invention, the positions of two arbitrary frames on which frame images are currently recorded and of which X-Y coordinate values differ from each other are designated and accurately positioned. By using these two frames as the reference and by obtaining the coordinate values of the "reference frames" and the reference pitch, any frame which corresponds to a frame address can be automatically retrieved.

Figure 3:
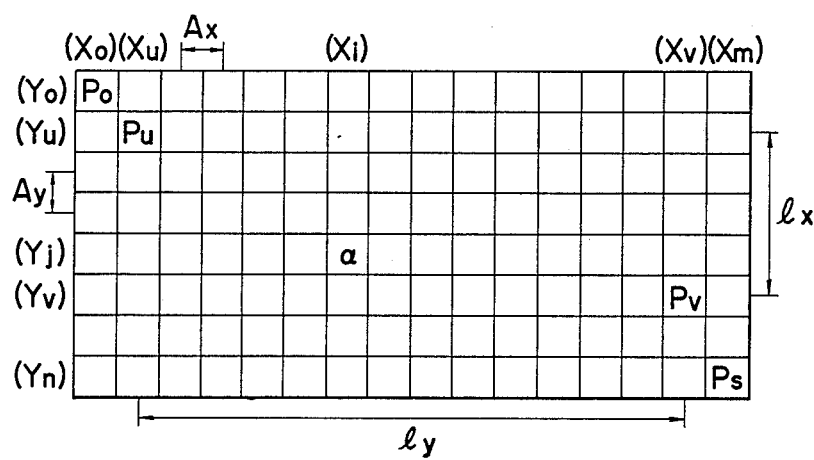
FIG. 3 is a graph to explain the method for positioning a frame according to the present invention.

FIG. 3 is a graph explaining a method for positioning a frame according to the present invention. The same reference numerals denote the same elements in both figures. In FIG. 3, when no frame images are recorded in the "reference frame" $P_0$ and the "span frame" $P_s$ and the above mentioned method for positioning a frame is therefore not applicable, the mode of the microfiche retrieval device is converted to a "Frame Pitch Adjustment Mode" and the above mentioned two frames recorded with images are designated. By precisely positioning the two frames, the coordinate values of the reference frame and the reference pitch are calculated to thereby enable positioning of arbitrary frames of which the address has been inputted. These two frames may be arbitrarily designated. However, in order to precisely position the frame to be retrieved as explained above, these two frames are preferably those at the positions as far apart as possible in the X-Y directions. This example uses the first frame $P_u$ which is closest to the reference frame $P_0$ and on which a frame image is recorded and the second frame $P_v$ which is closest to the span frame $P_s$ and on which a frame image is recorded.

Figure 4:
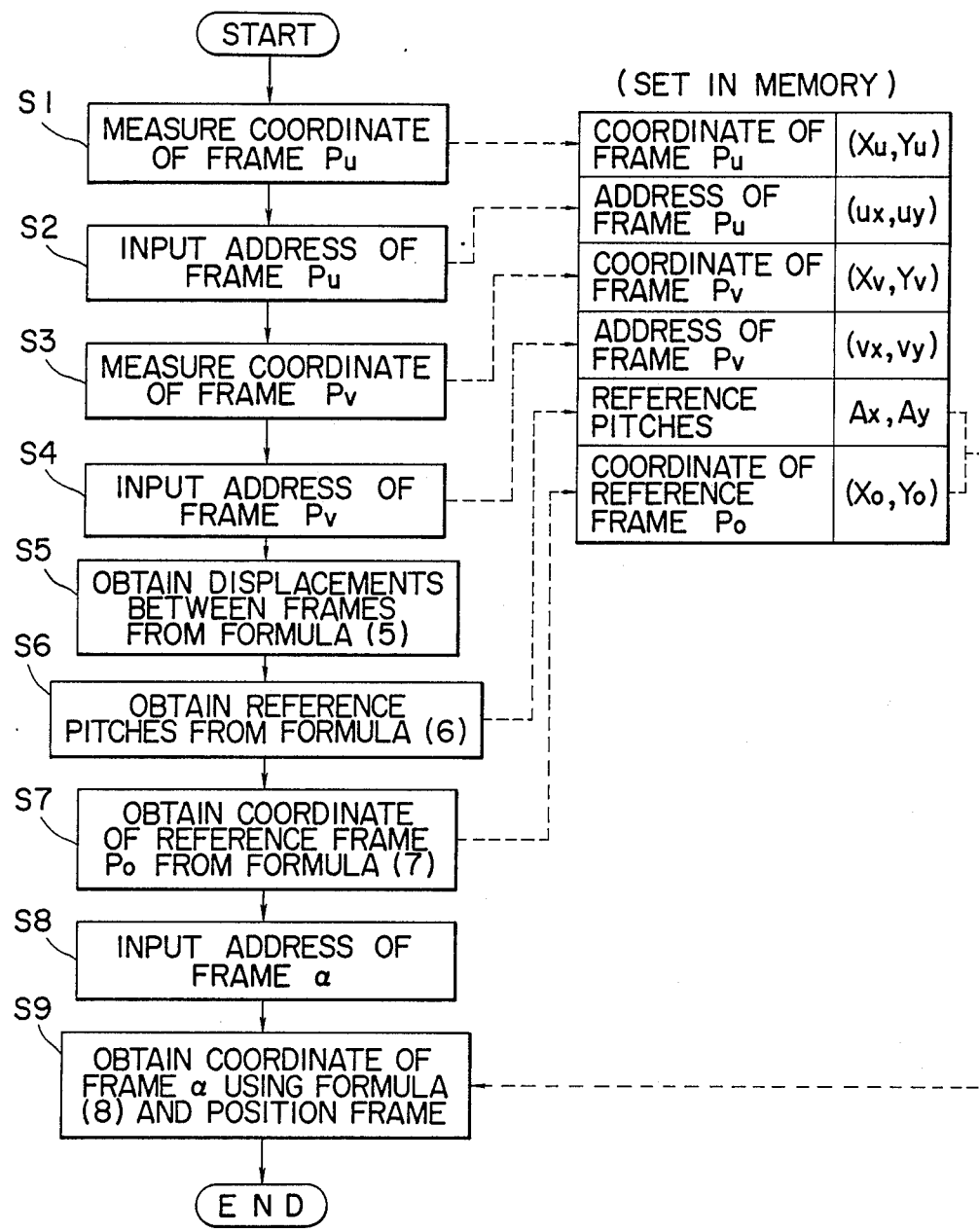
FIG. 4 is a flow chart to show the operation according to the present invention.

FIG. 4 is a flow chart showing the operation of the method for positioning a frame according to the present invention. The present invention is explained in detail in the following referring to the flow chart.

In order to retrieve a frame $\alpha$ shown in FIG. 3, the microfische retrieval device is first switched to "Frame Pitch Adjustment Mode" before starting the operation. The above mentioned first frame $P_u$ (the address thereof being $(u_x, u_y)$ and the second frame $P_v$ (the address thereof being $(v_x, v_y)$) are designated. The first frame $P_u$ is projected first and is precisely positioned at the center of the screen using the "Fine Adjustment Key". The coordinates $(X_u, Y_u)$ thereof are measured while the address $(u_x, u_x)$ of the frame $P_u$ is displayed on the display unit (not shown) (Step S1). The address $(u_x, u_y)$ of the projected first frame $P_u$ is inputted from a keyboard (not shown) while the address $(u_x, u_y)$ of the first frame $P_u$ and the coordinate value $(X_u, Y_u)$ are recorded in the memory (not shown) (Step S2) by using the "Start Key" (not shown). Then, the second frame $P_v$ is projected in the same manner, positioned precisely at the center of the screen using "Fine Adjustment Key", and the coordinates $(X_v, Y_v)$ thereof are measured while the address $v_x, v_y)$ of the frame $P_v$ are displayed on the display unit (not shown) (Step S3). While the address $(v_x, v_y)$ of the projected second frame $P_v$ is inputted from the keyboard, the frame address $(v_x, v_y)$ of the second frame $P_v$ and the coordinates $(X_v, Y_v)$ are recorded in the memory by operating the "Start Key" (Step S4).

The retrieval device then obtains the displacements $l_x$ and $l_y$ between these two frames $P_u$ and $P_v$ from the coordinates thereof by the following equations (5) (Step S5):

$$\left. \begin{array}{l} l_x = X_v - X_u \\ l_y = Y_v - Y_u \end{array} \right\} \quad (5)$$

Using the above displacements $l_x$ and $l_y$ and the number $((v_x-u_x)\times(v_y-u_y))$ of frames between the above two frames $P_u$ and $P_v$, reference pitches $A_x$ and $A_y$ are calculated from the following formula (6) and recorded in the above mentioned memory (Step S6):

$$\left. \begin{array}{l} A_x = l_x/(v_x - u_x) \\ A_y = l_y/(v_y - u_y) \end{array} \right\} \quad (6)$$

Then, the coordinates $(X_0, Y_0)$ of the reference frame $P_0$ is calculated from the following formula (7) using the above first frame $P_u$ and the reference pitches $A_x$ and $A_y$ obtained from the formula (6) and recorded in the memory (Step S7).

$$\left. \begin{array}{l} X_o = X_u - u_x \cdot A_x = X_u - u_x \cdot \dfrac{X_v - X_u}{v_x - u_x} \\ Y_o = Y_u - u_y \cdot A_y = Y_u - u_y \cdot \dfrac{Y_v - Y_u}{v_y - u_y} \end{array} \right\} \quad (7)$$

The reference frame coordinates and the reference pitches necessary for positioning a frame are thus obtained. If the frame address of a frame to be retrieved, for example (i, j) of "$\alpha$" shown in FIG. 3, is inputted (Step S8), the coordinates $(X_i, Y_j)$ of the frame $\alpha$ can be calculated using the coordinates $(X_0, Y_0)$ of the $P_0$ and the above reference pitches $A_x$ and $A_y$ from the following formula (8) (Step S9):

$$\left. \begin{array}{rl} X_i =& X_o + i \cdot A_x \\ =& X_u - u_x \cdot A_x + i \cdot A_x = X_u + (i - u_x) \cdot A_x \\ =& X_u + (i - u_x) \cdot \dfrac{X_v - X_u}{v_x - u_x} \\ Y_i =& Y_o + j \cdot A_y \\ =& Y_u - u_y \cdot A_y + j \cdot A_y = Y_u + (j - u_y) \cdot A_y \\ =& Y_u + (j - u_y) \cdot \dfrac{Y_v - Y_u}{v_x - u_x} \end{array} \right\} \quad (8)$$

According to this method of positioning a frame, as explained above, two arbitrary frames of a microfiche with images recorded thereon are designated; displacements $l_x$ and $l_y$ therebetween are measured; and the largest displacements $l_x$ and $l_y$ thereof are divided by the number of frames respectively to obtain the reference pitches $A_x$ and $A_y$. When there is an error in the reference pitches $A_x$ and $A_y$ which are to be the reference for retrieving a frame, the error will accumulate and make it impossible to retrieve the object frame. In order to minimize the error, two frames which are as far apart as possible should be designated as the two arbitrary frames. This makes the error accumulated in each frame extremely small, which in turn enables accurate positioning of the object frame. Even if the size of the microfiche should change, or the size thereof should fluctuate, the error therefrom will be extremely small without being accumulated in each frame and precise and appropriate positioning of the object frame can be achieved. By repeating the above steps S8 to S9, a specified frame can be accurately positioned.

In the above mentioned embodiment, the coordinates of the reference frame are obtained based on the two arbitrarily designated frames and the object frame is positioned based on the reference frames thereabove. However, the coordinate values of above mentioned to frames and the object frame which has been positioned may be stored each time without obtaining the reference frame in advance and the next frame can be positioned based on the frame data.

Such data as the frame addresses and coordinate values of the two frames, reference pitches, coordinate values of the reference frame, etc. obtained as above can be stored after the completion of retrieval operation. Then such data can be read out and designated when retrieval of a microfiche of the same size is required next time so that above operation to obtain reference frame addresses and reference pitches can be omitted, allowing quick and easy retrieval operation.

As explained above, according to the present invention method for positioning a frame, even if frame images are not recorded on the above reference frame and the span frame, two arbitrary frames proximal to the reference frame and span frame respectively can be accurately positioned and the coordinate values thereof can be measured. Thus, arbitrary frames can be positioned in correspondence with the addresses thereof to enable automatic retrieval.

It should be understood that many modifications and adaptations of the invention will become apparent to those skilled in the art and it is intended to encompass such obvious modifications and changes in the scope of the claims appended hereto.

What is claimed is:

1. A frame positioning method which can precisely position a frame recorded on a microfiche mounted in a retrieval device comprising the steps of:
    designating two arbitrary frames of different addresses which are recorded on the microfiche mounted in a retrieval device;
    obtaining addresses of the two arbitrary frames when they are displaced with respect to a predetermined position;
    obtaining coordinates of the two arbitrary frames;
    calculating a reference frame pitch between the two arbitrary frames;
    calculating reference coordinates using the addresses and coordinates of the two arbitrary frames;
    wherein the two arbitrary frames are designated in a manner such that the distance between the two arbitrary frames is maximized.

2. A frame positioning method which can precisely position a frame recorded on a microfiche mounted in a retrieval device comprising the steps of:
    designating two arbitrary frames of different addresses which are recorded on a microfiche mounted in a retrieval device;
    obtaining the addresses of the two arbitrary frames when they are displaced with respect to a predetermined position;
    obtaining coordinates of the two arbitrary frames;
    calculating a reference frame pitch between the two arbitrary frames;
    calculating reference coordinates using the addresses and coordinates of the two arbitrary frames;
    wherein one of the two arbitrary frames is a frame closest to a reference frame with an image recorded thereon and the other of the two arbitrary frames is a frame closest to a span frame with an image recorded thereon.

3. A frame positioning method which can precisely position a frame recorded on a microfiche mounted in a retrieval device comprising the steps of:
    designating two arbitrary frames of different addresses which are recorded on a microfiche mounted on a retrieval device;
    obtaining the addresses of the two arbitrary frames when they are displaced with respect to a predetermined position;
    obtaining coordinates of the two arbitrary frames;
    calculating a reference frame pitch between the two arbitrary frames;
    calculating reference coordinates using the addresses and coordinates of the two arbitrary frames; and
    displaying each of the two arbitrary frames at the center of a display screen and measuring and storing positional data of each of the two arbitrary frames.

* * * * *